(12) United States Patent
Jang et al.

(10) Patent No.: US 9,293,956 B2
(45) Date of Patent: Mar. 22, 2016

(54) BUS BAR OF MOTOR AND BUS BAR HOUSING

(75) Inventors: Jeong Cheol Jang, Gwangju (KR); Je Hyung Seo, Gwangju (KR); Hugh Jin Cho, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 202 days.

(21) Appl. No.: 14/001,499

(22) PCT Filed: Jan. 31, 2012

(86) PCT No.: PCT/KR2012/000709
§ 371 (c)(1),
(2), (4) Date: Aug. 23, 2013

(87) PCT Pub. No.: WO2012/141417
PCT Pub. Date: Oct. 18, 2012

(65) Prior Publication Data
US 2013/0328426 A1 Dec. 12, 2013

(30) Foreign Application Priority Data
Apr. 13, 2011 (KR) .................. 10-2011-0034151

(51) Int. Cl.
*H02K 3/28* (2006.01)
*H02K 3/52* (2006.01)
(52) U.S. Cl.
CPC .............. *H02K 3/28* (2013.01); *H02K 3/522* (2013.01); *H02K 2203/09* (2013.01)
(58) Field of Classification Search
CPC ...... H02K 3/28; H02K 3/522; H02K 2203/09
USPC .......................................... 310/71
See application file for complete search history.

(56) References Cited

U.S. PATENT DOCUMENTS

| 4,287,446 A | * | 9/1981 | Lill | H02K 3/28 310/71 |
| 4,557,544 A | * | 12/1985 | Esser | H01R 4/2462 439/391 |
| 4,894,571 A | * | 1/1990 | Hildebrandt et al. | 310/68 C |

(Continued)

FOREIGN PATENT DOCUMENTS

| JP | 09-285057 A | 10/1997 |
| JP | 2003-134759 A | 5/2003 |

(Continued)

OTHER PUBLICATIONS

English machine translation for JP 2008-079465.*

(Continued)

*Primary Examiner* — Terrance Kenerly
*Assistant Examiner* — Ahmed Elnakib
(74) *Attorney, Agent, or Firm* — Revolution IP, PLLC (57) ABSTRACT

Disclosed is a bus bar having a plurality of connection taps formed radially therefrom, the bus bar including: first, second and third faces extended sequentially from the end of each connection tap in such a manner as to have a U-like side shape; and a coil insertion portion having a groove formed in a length direction of each connection tap on the center portions of the first, second and third faces and having a thickness lower than the thicknesses of the first, second and third faces, the coil insertion portion having a coil inserted into the groove thereof.

4 Claims, 9 Drawing Sheets

(56) References Cited

U.S. PATENT DOCUMENTS

| | | | | |
|---|---|---|---|---|
| 5,782,652 | A * | 7/1998 | Feher | H01R 4/2462 310/71 |
| 7,374,449 | B2 * | 5/2008 | Demuth et al. | 439/404 |
| 2003/0173841 | A1 * | 9/2003 | Kobayashi et al. | 310/71 |
| 2009/0189473 | A1 * | 7/2009 | Castle | H02K 1/04 310/186 |
| 2009/0189475 | A1 * | 7/2009 | Shin | H02K 3/522 310/195 |
| 2010/0156231 | A1 * | 6/2010 | Lee | H02K 1/148 310/179 |
| 2011/0018376 | A1 * | 1/2011 | Kataoka | H02K 3/522 310/71 |
| 2011/0316365 | A1 * | 12/2011 | Kim | H02K 1/18 310/43 |

FOREIGN PATENT DOCUMENTS

| | | | |
|---|---|---|---|
| JP | 2008-079465 | * | 4/2008 |
| JP | 2008-079465 | A | 4/2008 |
| KR | 10-2008-0068437 | A | 7/2008 |
| KR | 20090007696 | * | 7/2009 |
| KR | 10-2010-0046922 | A | 5/2010 |
| KR | 10-2010-0059548 | A | 6/2010 |
| KR | 10-2010-0131038 | A | 12/2010 |

OTHER PUBLICATIONS

Catalog 82221 by tycoelectronics.com.*
English machine translation for KR 20090007696.*
International Search Report of PCT/KR2012/000709 mailed on Aug. 29, 2012 from ISA/KR.

* cited by examiner

BUS BAR OF MOTOR AND BUS BAR HOUSING

CROSS REFERENCE TO PRIOR APPLICATIONS

This application is a National Stage Application of PCT International Patent Application No. PCT/KR2012/000709 filed on Jan. 31, 2012, under 35 U.S.C. §371, which claims priority to Korean Patent Application No. 10-2011-0034151 filed on Apr. 13, 2011, which are all hereby incorporated by reference in their entirety.

TECHNICAL FIELD

The present invention relates to a bus bar of a motor, and more particularly, to a bus bar of a motor wherein connection taps mounted thereon and a bus bar housing are newly structured for the connection of coils to the bus bar, thereby improving the coil connection capability and the electric current conduction reliability.

BACKGROUND ART

In general, a motor, especially, a brushless motor for an automobile has a parallel connection structure of three phases, u, v and w. The respective three-phase input/output terminals are electrically connected to a ring-shaped bus bar, and the end portions of the coils wound around the stator core are connected to the connection taps of the bus bar.

Conventional bus bar structures for connection to the coils have been disclosed in Korean Patent Application Laid-Open Nos. 10-2008-0068437, 10-2010-46922, and 10-2010-0059548. In the conventional practices, so as to improve the conduction of electric current in a process in which the end portions of the coils are electrically connected to the connection taps of the bus bar, the film of the coil with which the connection taps are contacted should be removed, which undesirably lowers the workability and the whole productivity.

Further, so as to make the shapes of the connection taps or after the connection taps are connected to the coils, separate punching or caulking should be carried out, thereby undesirably lowering the workability.

To solve the above-mentioned conventional problems, thus, the inventors propose to a bus bar of a motor whose connection tap structure is improved and also propose to a bus bar housing whose structure is improved, thereby achieving the easiness of the work.

DISCLOSURE OF INVENTION

Technical Problem

Accordingly, the present invention has been made in view of the above-mentioned problems occurring in the prior art, and it is an object of the present invention to provide a bus bar that has a structure in which coils are more easily connected to connection taps thereof.

It is another object of the present invention to provide a bus bar that connects connection taps to coils, without removing the film on the end portions of the coils, thereby ensuring the conduction of electric current.

It is still another object of the present invention to provide a bus bar housing that has a structure in which coils are more easily connected to connection taps of a bus bar.

The above object and other objects of the present invention will be easily achieved by a preferred embodiment of the present invention as will be described below.

Solution to Problem

To accomplish the above objects, according to another aspect of the present invention, there is provided a bus bar housing having a plurality of MAG-MATEs disposed radially with respect to at least one or more bus bar insertion grooves into which a bus bar having a plurality of connection taps is inserted in such a manner as to insert the plurality of connection taps thereinto.

According to the present invention, preferably, each MAG-MATE includes a connection tap seating portion into which each connection tap is located; a coil coupling portion into which the end of each connection tap is inserted; a coil introducing portion serving as a groove into which the coil is introduced; and a coil seating portion into which the coil introduced from the coil introducing portion is located formed in a direction of the introduction of the coil.

According to the present invention, desirably, the groove of the coil insertion portion has a width smaller than the diameter of the coil so as to perform complete connection to the coil.

To accomplish the above objects, according to another aspect of the present invention, there is provided a bus bar housing having a plurality of mag mates disposed radially with respect to at least one or more bus bar insertion grooves into which a bus bar having a plurality of connection taps is inserted in such a manner as to insert the plurality of connection taps thereinto.

According to the present invention, preferably, each mag mate includes a connection tap seating portion into which each connection tap is located; a coil coupling portion into which the end of each connection tap is inserted; a coil introducing portion serving as a groove into which the coil is introduced; and a coil seating portion into which the coil introduced from the coil introducing portion is located formed in a direction of the introduction of the coil.

Advantageous Effects of Invention

According to the present invention, there is provided the bus bar and the bus bar housing that is capable of easily performing the connecting work to the coils, thereby improving the productivity thereof.

BEST MODE FOR CARRYING OUT THE INVENTION

Hereinafter, an explanation on a bus bar according to the present invention will be in detail given with reference to the attached drawings.

Figure 1:
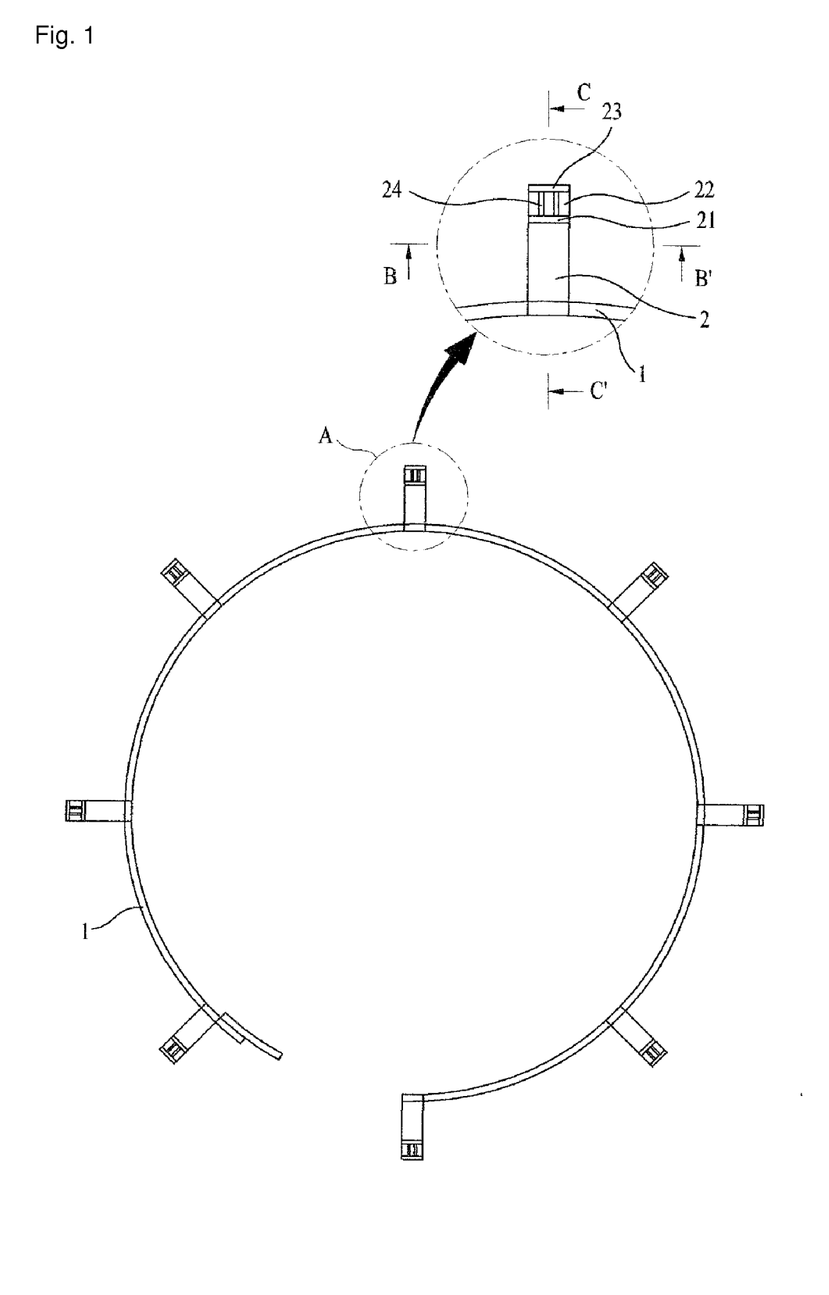
FIG. 1 is a plane view showing a bus bar according to the present invention.

FIG. 1 is a plane view showing a bus bar according to the present invention.

As shown in FIG. 1, a bus bar 1 according to the present invention is used to electrically connect the ends of the coils wound on a stator of a motor in parallel, and typically, four bus bars are used for the connection of three phases u, v and w and a neutral point. FIG. 1 shows one of the four bus bars. The four bus bars having such a shape as shown in FIG. 1 have diameters different a little from each other in such a manner as to be sequentially located to each other.

The bus bar 1 according to the present invention has a plurality of connection taps 2 formed thereon. The ends of the coils are electrically connected to the connection taps 2, thereby permitting the respective phases to be connected in parallel. The connection taps 2 are formed radially along one bus bar 1. In FIG. 1, the connection taps 2 are formed radially outwardly from the bus bar 1. According to the present invention, the connection taps 2 may be formed inwardly from the bus bar 1, if necessary, and they may be formed outwardly from the circle formed by the bus bar 1, as shown in FIG. 1. That is, the radial formation of the connection taps 2 mentioned in the present invention means both of them.

A portion 'A' of FIG. 1 shows an enlarged connection tap 2, and the structure of the connection tap 2 will be explained with reference to the portion 'A'. As shown in FIG. 1, the connection tap 2 of the bus bar 1 has a first face 21, a second face 22 and a third face 23 formed on the opposite side to the portion connected to the bus bar 1 and has a coil insertion portion 24 formed through the center portions of the first face 21, the second face 22 and the third face 23. The respective structures of the first to third faces 21 to 23 and the coil insertion portion 24 will be described with reference to FIGS. 2 to 4.

Figure 2:
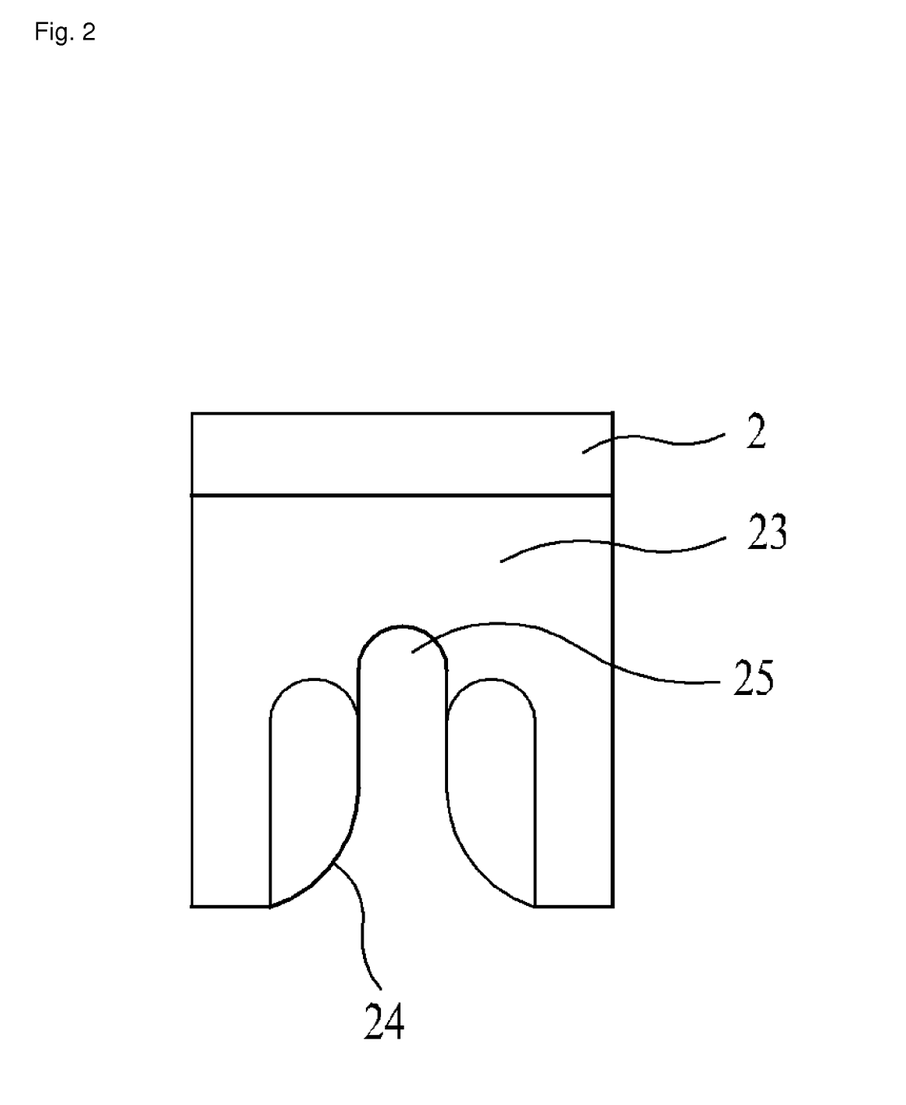
FIG. 2 is a sectional view taken along the line B-B' of FIG. 1.
Figure 3:
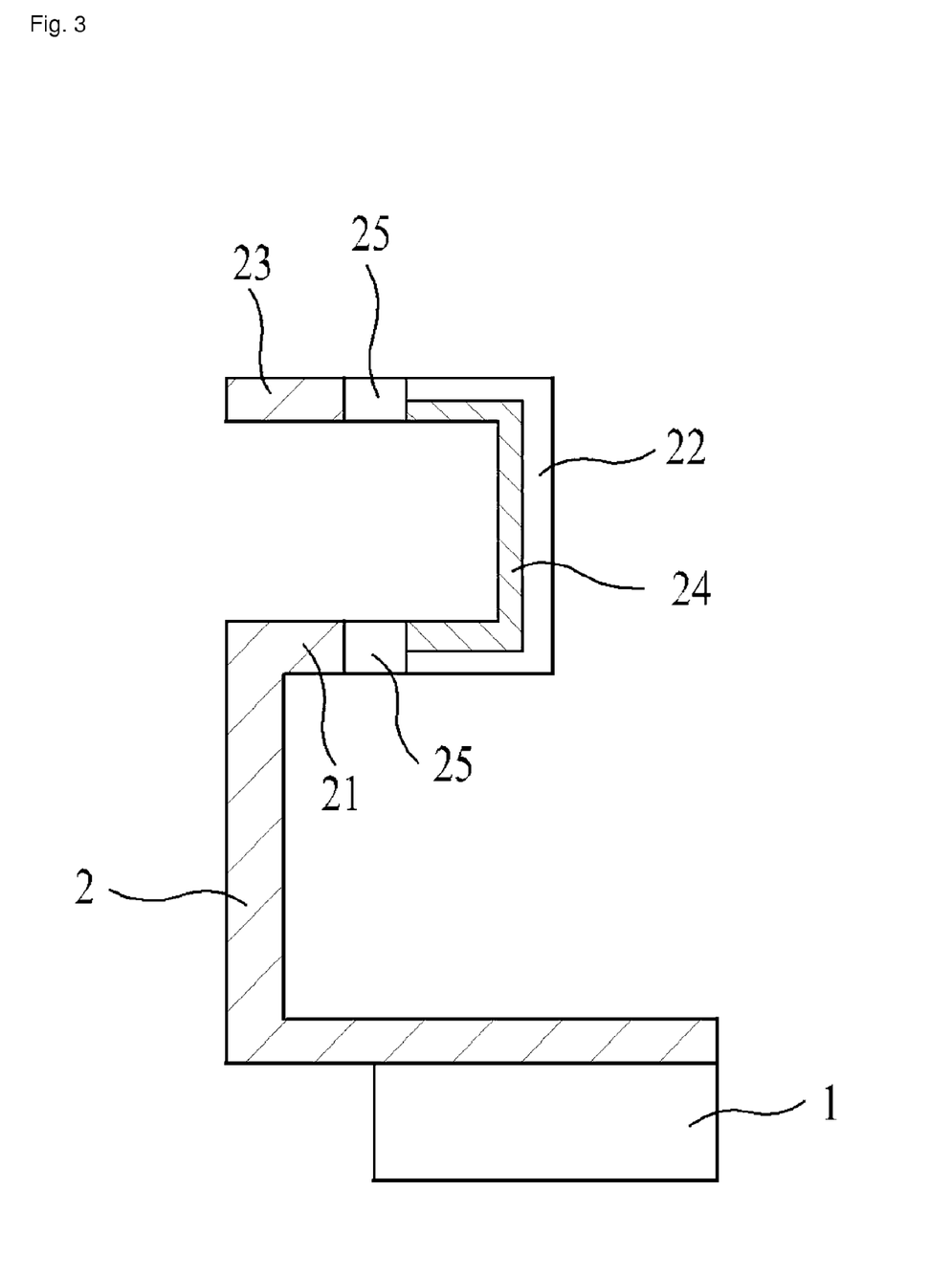
FIG. 3 is a sectional view taken along the line C-C' of FIG. 1.
Figure 4:
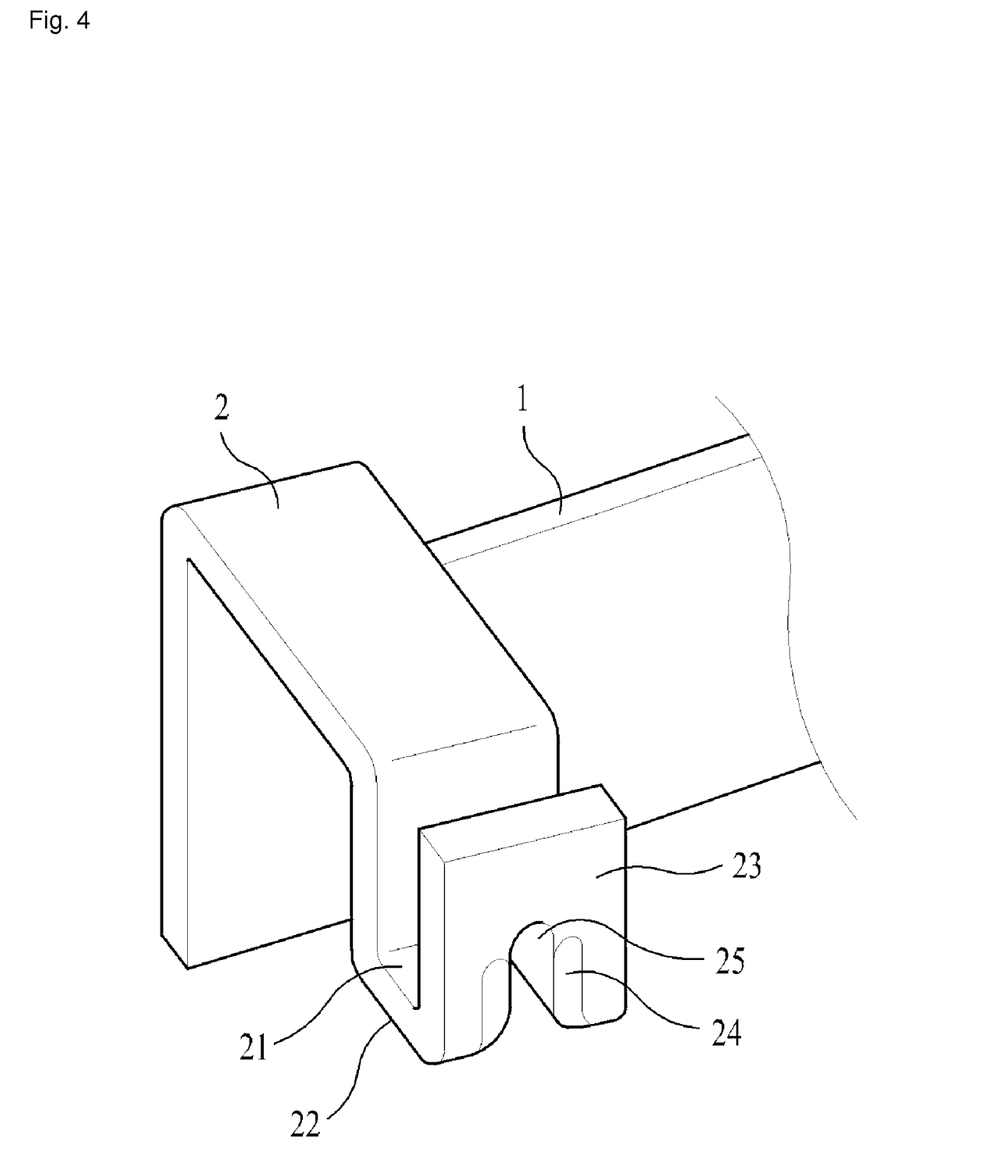
FIG. 4 a perspective view showing a structure of a connection tap of the bus bar according to the present invention.

FIG. 2 is a sectional view taken along the line B-B' of FIG. 1, FIG. 3 is a sectional view taken along the line C-C' of FIG. 1, and FIG. 4 a perspective view showing a structure of a connection tap of the bus bar according to the present invention.

Referring to FIGS. 2 to 4, the first face 21 is bent vertically by about 90 relative to the end portion of the connection tap 2. The second face 22 is bent horizontally by about 90 relative to the first face 21, and the third face 23 is bent vertically by about 90 relative to the second face 22. The first to third faces 21 to 23 have a generally U-like shape as shown in FIGS. 3 and 4.

The coil insertion portion 24 is formed on the center portions of the first to third faces 21 to 23 in a length direction of the connection tap 2, which is a little smaller than the thickness of each of the first to third faces 21 to 23, such that the coil is forcedly inserted vertically into a groove formed along the center of the coil insertion portion 24. Since the portion of the coil insertion portion 24 contacted with the coil has a sharp surface, the coil inserted thereinto is peeled off on the film thereof, while being forcedly pressed and fitted to the groove of the coil insertion portion 24, thereby achieving the conduction of electric current between the coil and the connection tap 2. Thus, the groove of the coil insertion portion 24 should have a width smaller than the diameter of the coil. According to the present invention, like this, the process for removing the film of the coil is not needed, thereby simplifying the manufacturing process. The coil inserted into the groove of the coil insertion portion 24 is fixedly located to a coil connection portion 25. The coil connection portion 25 is formed on the ends of the coil insertion portion 24 formed on the first and third faces 21 and 23 and desirably has the similar shape to the sectional shape of the coil and the diameter a little smaller than the coil.

The first to third faces 21 to 23, the coil insertion portion 24 and the coil connection portion 25 may be formed together by means of pressing, when the bus bar 1 is blanked from an electric steel plate, and the first to third faces 21 to 23 are formed by bending the blanked steel plate. The coil insertion portion 24 is formed passed through a portion of the first face 21, the second face 22 and a portion of the third face 23. The coil connection portion 25 is formed on both ends of the coil insertion portion 24 formed on the first face 21 and the third face 23.

Figure 5:
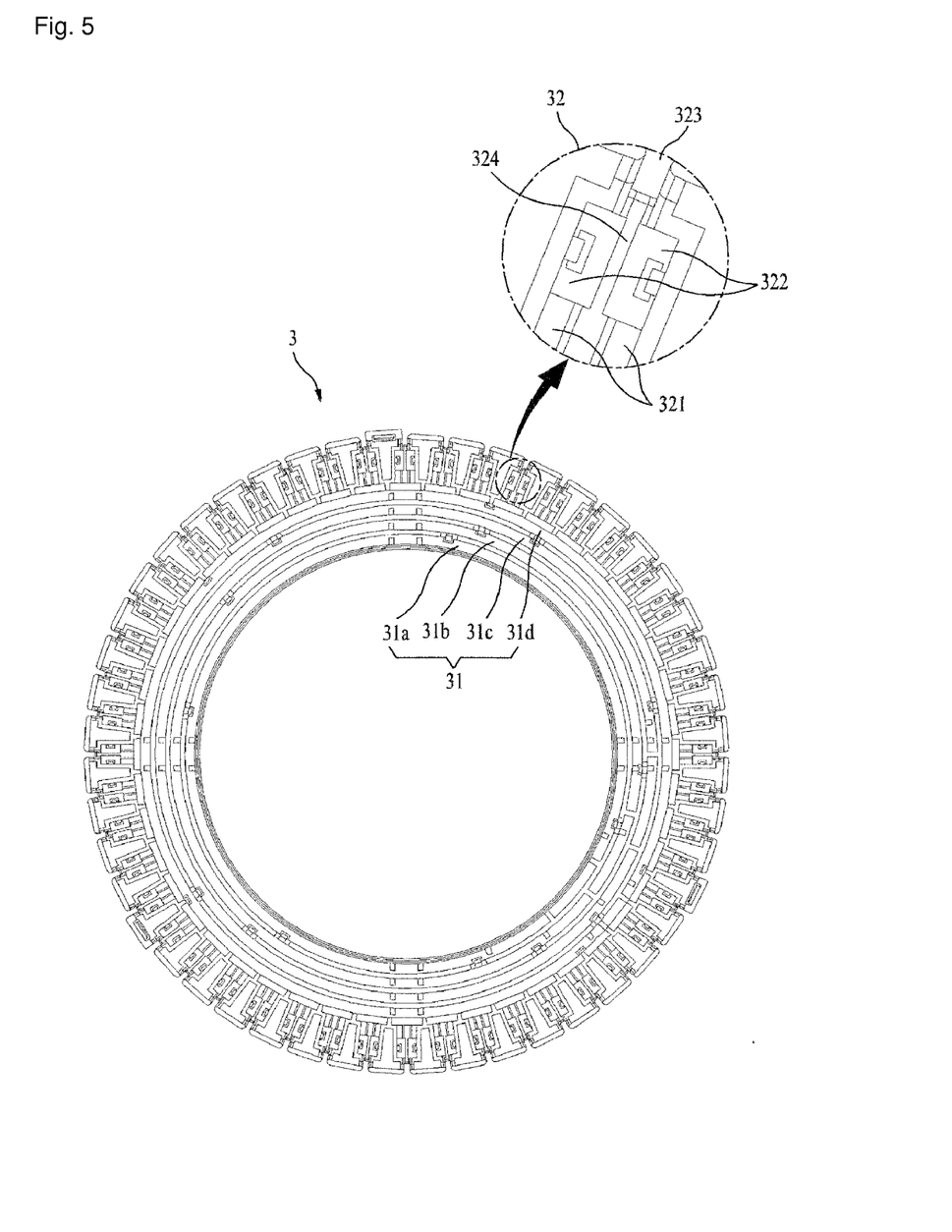
FIG. 5 is a plane view showing a bus bar housing according to the present invention, into which the bus bar is inserted.
Figure 6:
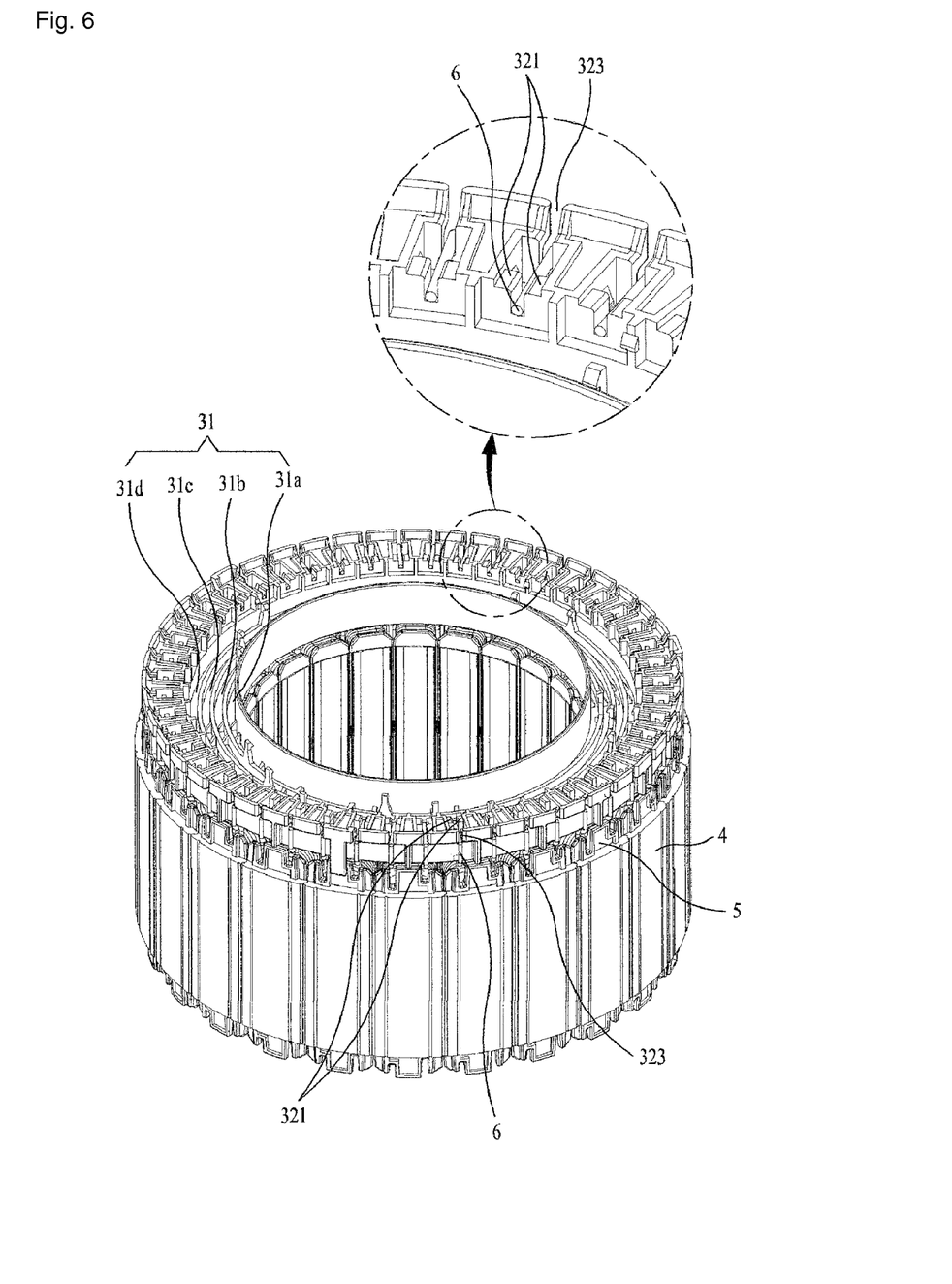
FIG. 6 is a perspective view showing a coupled state between the bus bar housing according to the present invention and a stator core.

FIG. 5 is a plane view showing a bus bar housing according to the present invention, into which the bus bar is inserted, and FIG. 6 is a perspective view showing a coupled state between the bus bar housing according to the present invention and a stator core.

As shown in FIGS. 5 and 6, the bus bar housing 1 according to the present invention includes a plurality of bus bar insertion grooves 31 and a plurality of MAG-MATEs 32 annularly formed therealong. The bus bar insertion grooves 31 serve to insert the plurality of bus bars 1 thereinto, and for example, as shown in FIGS. 5 and 6, four bus bar insertion grooves 31a, 31b, 31c and 31d are formed for the connection of the three phases u, v and w and the neutral point. If necessary, however, the number of bus bar insertion grooves may be set in accordance with the use environments.

The MAG-MATEs 32 are disposed radially along the outer periphery of the bus bar insertion grooves 31, and on the MAG-MATEs 32, one coil 6 and one connection tap 2 are electrically connected to each other. Each MAG-MATE 32 includes a connection tap seating portion 321, a coil coupling portion 322, and a coil introducing portion 323 and a coil seating portion 324.

The connection tap seating portion 321 is formed to locate the connection tap 2 thereinto. The first to third faces 21 to 23 formed on the end portion of the connection tap 2 are located in the coil coupling portion 322. The coil 6 is located inwardly from the coil introducing portion 323 serving as a passage formed on the outside of each MAG-MATE 32. The coil seating portion 324 is formed on the lower portion of the coil 6.

The coil seating portion 324 is formed along the direction in which the coil 6 is introduced, and in the state where the coil 6 is located in the coil seating portion 324, if the first to third faces 21 to 23 are inserted into the coil coupling portion 322, the coil 6 is inserted into the coil insertion portion 24. Like this, the coil 6 is located into the coil seating portion 324 through the coil introducing portion 323, and next, the connection tap 2 is located into the connection tap seating portion 321. At the same time, the first to third faces 21 to 23 are inserted into the coil coupling portion 322, thereby achieving the conduction of electric current between the coil 6 and the bus bar 1. Accordingly, the conduction of electric current between the coil 6 and the bus bar 1 can be more easily carried out.

As mentioned above, the bus bar housing 3 having the plurality of bus bar insertion grooves 31 and the plurality of mag mates MAG-MATEs 32 is placed on an insulator 5 coupled to a stator core 4, as shown in FIG. 6. A state where the bus bar 1 is applied to the bus bar housing 3 will be explained with reference to FIGS. 7 to 9.

Figure 7:
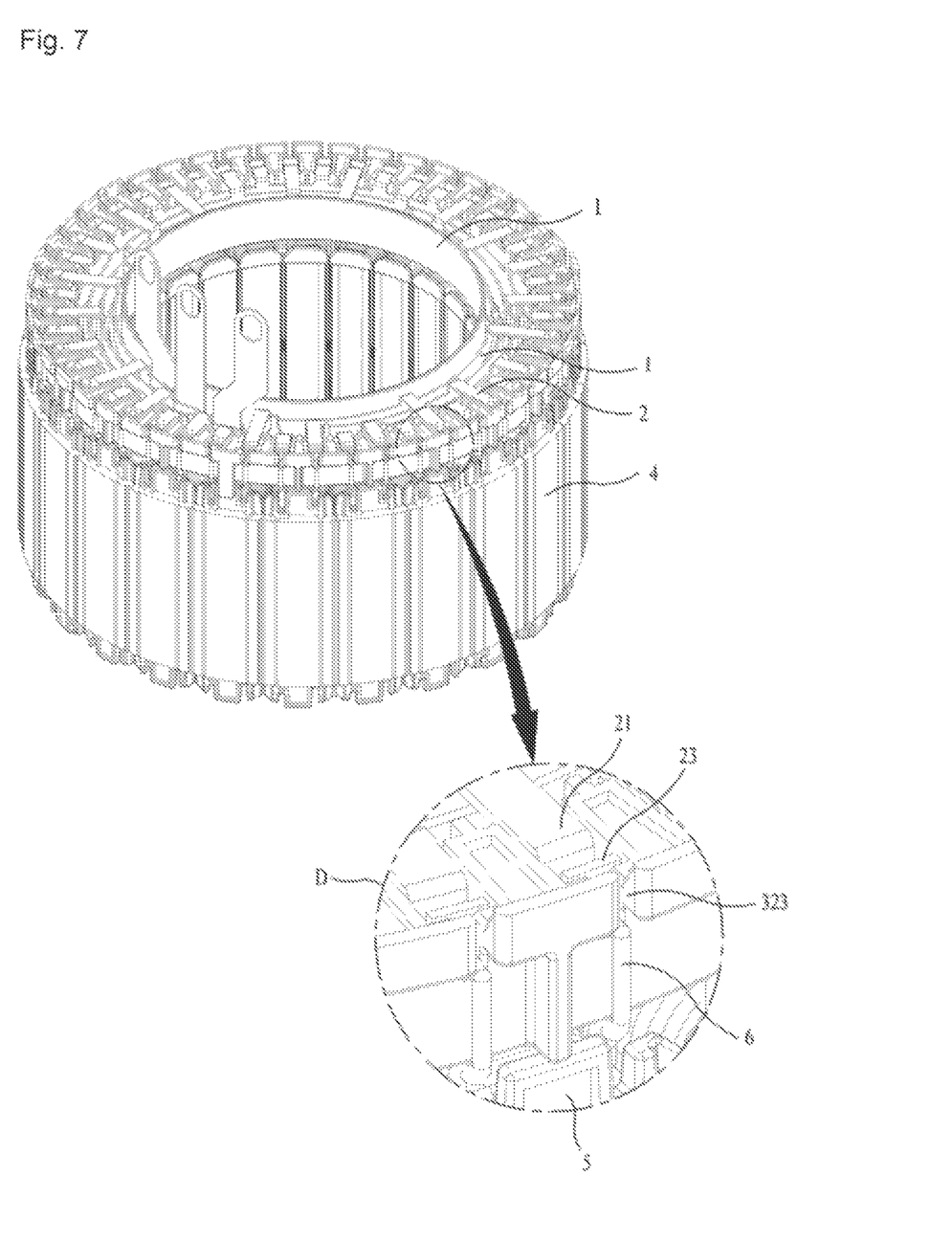
FIG. 7 is a perspective view showing the state where the bus bar is inserted into the bus bar housing according to the present invention.
Figure 8:
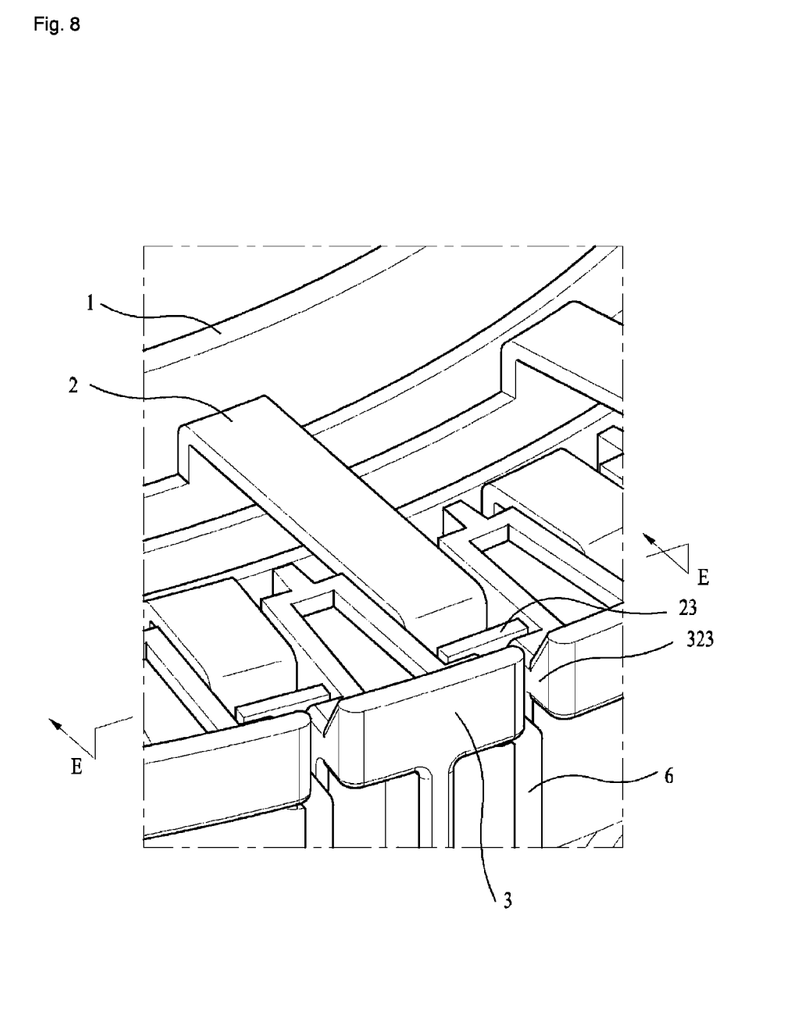
FIG. 8 is an enlarged perspective view showing a portion 'D' of FIG. 7.
Figure 9:
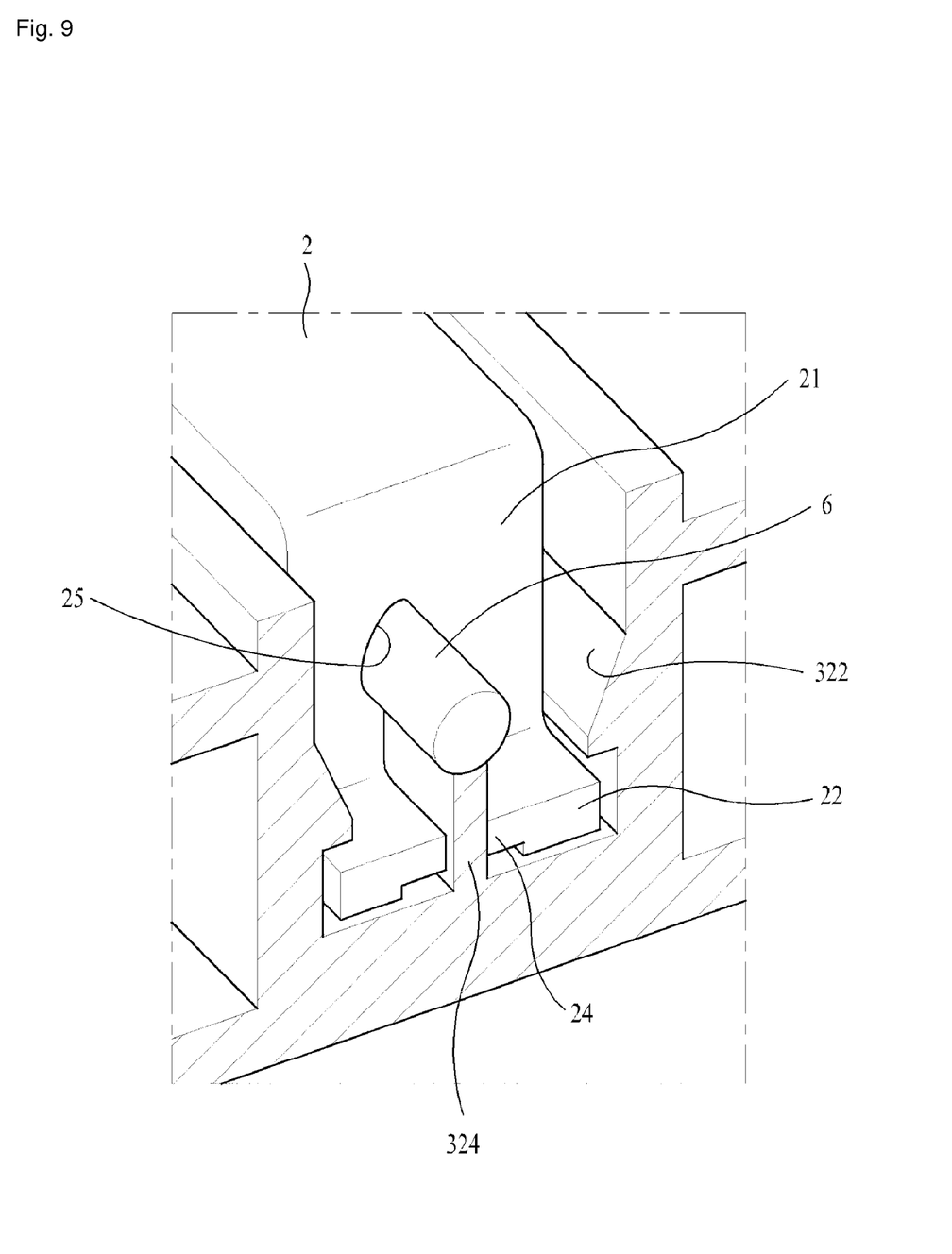
FIG. 9 is a sectional view taken along the line E-E' of FIG. 8.

FIG. 7 is a perspective view showing the state where the bus bar is inserted into the bus bar housing according to the present invention, FIG. 8 is an enlarged perspective view showing a portion 'D' of FIG. 7, and FIG. 9 is a sectional view taken along the line E-E' of FIG. 8.

As shown in FIGS. 7 to 9, the four bus bars 1 are inserted into the bus bar insertion grooves 31 of the bus bar housing 3. The bus bars 1 are disposed radially with different diameters from each other. The connection taps 2 of the bus bars 1 are disposed on the MAG-MATEs 32 of the bus bar housing 3, and the first to third faces 21 to 23 on the ends of each connection tap 2 are inserted into the coil coupling portion 322. The coil 6 is located into the coil seating portion 324 through the coil introducing portion 323. As shown in FIG. 9, the coil seating portion 324 is located into the coil insertion portion 24 of each connection tap 2. Accordingly, the coil 6 placed into the coil seating portion 324 is passed through the coil insertion portion 24 and coupled to the coil connection portion 25 at the time when the first to third faces 21 to 23 are inserted into the coil coupling portion 322.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A bus bar housing comprising:
  at least one or more bus bar insertion portions into which a bus bar having a plurality of connection taps is inserted,
  each connection tap comprising,
    a first face bent downward vertically relative to one end portion of the connection tap, the other end portion of the connection tap being connected to the bus bar,
    a second face bent horizontally relative to the first face, and
    a third face bent upward vertically relative to the second face; and
  a plurality of MAG-MATEs disposed radially with respect to the at least one or more bus bar insertion portions in such a manner as to insert the plurality of connection taps thereinto,
  each MAG-MATE comprising,
    a connection tap seating portion into which each connection tap is located,
    a coil coupling portion formed in a direction of the first, second, and third faces so that the end of each connection tap is inserted,
    a coil introducing portion serving as a groove into which the coil is introduced, the coil introducing portion formed in the same direction as the connection tap seating portion, and
    a coil seating portion formed in a direction of the introduction of the coil, into which the coil introduced from the coil introducing portion is located.

2. A bus bar housing, comprising:
  a bus bar having a plurality of connection taps formed radially therefrom,
  each connection tap comprising,
    a first face bent downward vertically relative to one end portion of the connection tap, the other end portion of the connection tap being connected to the bus bar,
    a second face bent horizontally relative to the first face, and
    a third face bent upward vertically relative to the second face,
    wherein the first, second and third faces are extended sequentially from the end of each connection tap in such a manner as to have a U-like side shape, and
    a coil insertion portion having a groove formed in a length direction of each connection tap on the center portions of the first, second and third faces and having a thickness smaller than the thicknesses of the first, second and third faces, the coil insertion portion having a coil inserted into the groove thereof,
  wherein at least one or more bus bar insertion portions into which the bus bar having the plurality of connection taps is inserted; and
  a plurality of MAG-MATEs disposed radially with respect to the at least one or more bus bar insertion portions in such a manner as to insert the plurality of connection taps thereinto,
  each MAG-MATE comprising,
    a connection tap seating portion into which each connection tap is located,
    a coil coupling portion formed in a direction of the first, second, and third faces so that the end of each connection tap is inserted,
    a coil introducing portion serving as a groove into which the coil is introduced, the coil introducing portion formed in the same direction as the connection tap seating portion, and
    a coil seating portion formed in a direction of the introduction of the coil, into which the coil introduced from the coil introducing portion is located.

3. The bus bar according to claim 2, wherein the coil insertion portion includes a coil seating portion, the coil seating portion formed on both ends of the coil insertion portion in such a manner as to have a thickness in the circumferential direction, and the groove width being smaller than the coil.

4. The bus bar according to claim 2, wherein the groove of the coil insertion portion has a width smaller than the diameter of the coil.

* * * * *